US011827146B1

United States Patent
Yang

(10) Patent No.: US 11,827,146 B1
(45) Date of Patent: Nov. 28, 2023

(54) METHOD AND SYSTEM FOR OUTPUTTING A WARNING WHEN A VEHICLE IS PARKED ON A SLOPE

(71) Applicant: MiTAC Digital Technology Corporation, Taoyuan (TW)

(72) Inventor: Chi-Bin Yang, Taoyuan (TW)

(73) Assignee: MiTAC Digital Technology Corporation, Taoyuan (TW)

( * ) Notice: Subject to any disclaimer, the term of this patent is extended or adjusted under 35 U.S.C. 154(b) by 0 days.

(21) Appl. No.: 17/901,902

(22) Filed: Sep. 2, 2022

(51) Int. Cl.
*B60Q 9/00* (2006.01)

(52) U.S. Cl.
CPC .................................. *B60Q 9/005* (2013.01)

(58) Field of Classification Search
CPC ......... B60W 40/02; G06K 9/62; B60Q 9/005; B60R 2300/806
USPC ....................................................... 340/425.5
See application file for complete search history.

(56) References Cited

U.S. PATENT DOCUMENTS

| 11,262,758 | B2 * | 3/2022 | Dingli | .................. G05D 1/0276 |
| 2017/0129536 | A1 * | 5/2017 | Xu | .......... B62D 6/001 |
| 2021/0116913 | A1 * | 4/2021 | Dingli | .................. G05D 1/0214 |

FOREIGN PATENT DOCUMENTS

CN  106379234 B  * 11/2018  ............. B60Q 9/002

* cited by examiner

*Primary Examiner* — Eric Blount
(74) *Attorney, Agent, or Firm* — Hammer & Associates, P.C.

(57) ABSTRACT

A method is provided for outputting a warning when a vehicle is parked on a slope. The method is to be implemented using a system that is mounted on the vehicle. The method includes steps of: determining a reference position of a steering wheel of the vehicle according to a motion status of the vehicle and a rotation status of the steering wheel with assistance of image recognition; obtaining a real-time angular difference between a current angular position of the steering wheel and the reference position; and when the vehicle meets a slope-parking condition, determining whether or not to output a warning related to operation of the steering wheel based on the real-time angular difference.

10 Claims, 2 Drawing Sheets

METHOD AND SYSTEM FOR OUTPUTTING A WARNING WHEN A VEHICLE IS PARKED ON A SLOPE

CROSS-REFERENCE TO RELATED APPLICATION

This application claims priority to Taiwanese Invention Patent Application No. 110132802, filed on Sep. 3, 2021.

FIELD

The disclosure relates to a method and a system for outputting a warning, and more particularly to a method and a system for outputting a warning when a vehicle is parked on a slope.

BACKGROUND

Sometimes a driver may need to park his/her vehicle on a slope. When parking downhill, the driver needs to turn the wheels of the vehicle toward the curb before leaving the vehicle so as to prevent the vehicle from rolling down. Even if the brake system of the vehicle fails for some reasons, turning the wheels toward the curb when parking downhill can stop the vehicle from rolling down as the wheels will touch the curb, so unwanted accidents can be avoided.

However, turning the wheels such way is only performed when parking downhill and thus may be forgotten by the driver.

SUMMARY

Therefore, an object of the disclosure is to provide a method and a system for outputting a warning when a vehicle is parked on a slope.

According to an aspect of the disclosure, the method is to be implemented using a system that is mounted on the vehicle.

The method includes steps of determining a reference position of a steering wheel of the vehicle according to a motion status of the vehicle and a rotation status of the steering wheel of the vehicle with assistance of image recognition; obtaining a real-time angular difference between a current angular position of the steering wheel and the reference position of the steering wheel; and when the motion status of the vehicle meets a slope-parking condition in which the vehicle is parked on the slope, determining whether or not to output a warning related to operation of the steering wheel based on the real-time angular difference.

According to another aspect of the disclosure, the system is adapted to be mounted on the vehicle and includes an image capturing unit and a processing unit.

The image capturing unit is configured to capture a video.

The processing unit is electrically connected to the image capturing unit to receive the video, and is configured to determine a reference position of a steering wheel of the vehicle according to a motion status of the vehicle and a rotation status of the steering wheel of the vehicle with assistance of image recognition performed on the video, obtain a real-time angular difference between a current angular position of the steering wheel and the reference position of the steering wheel, and when the motion status of the vehicle meets a slope-parking condition in which the vehicle is parked on the slope, determine whether or not to output a warning related to operation of the steering wheel based on the real-time angular difference.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
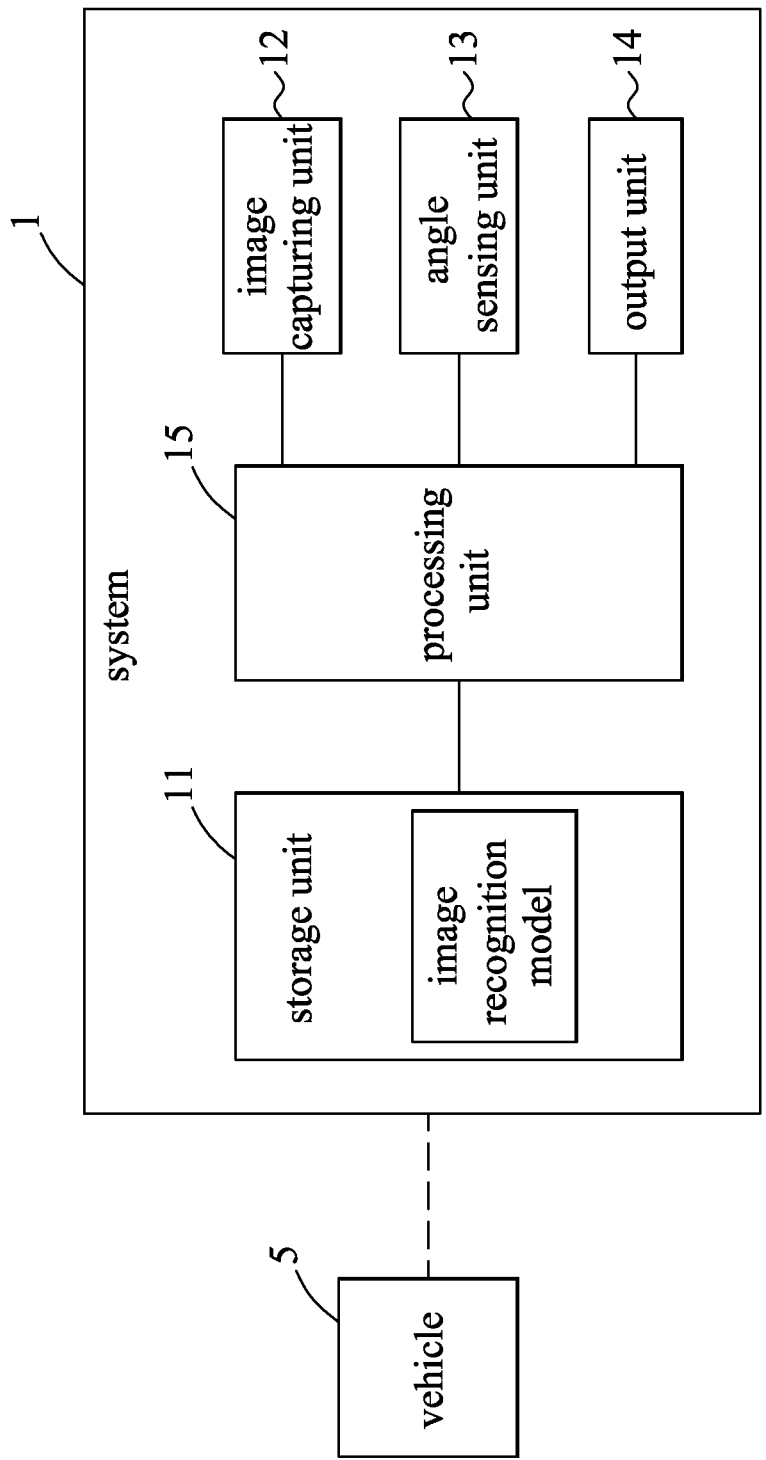
FIG. 1 is a block diagram illustrating a system for outputting a warning when a vehicle is parked on a slope according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating a system 1 for outputting a warning when a vehicle 5 is parked on a slope according to one embodiment of the disclosure. The system 1 may be mounted on the vehicle 5. The vehicle 5 includes a steering wheel, and is, for example, a small passenger vehicle, a truck or a large passenger vehicle.

In this embodiment, the system 1 includes a storage unit 11, an image capturing unit 12, an angle sensing unit 13, an output unit 14 and a processing unit 15. The processing unit 15 is electrically connected to the storage unit 11, the image capturing unit 12, the angle sensing unit 13 and the output unit 14.

In this embodiment, the storage unit 11 may be a memory module disposed in the vehicle 5, and is configured to store digital data. In some embodiments, the storage unit 11 may be a hard disk drive, a solid-state drive (SSD), other types of computer-readable storage media, a random access memory (RAM), a read only memory (ROM), a programmable ROM (PROM), a flash memory, or a combination of different types of computer-readable storage media. In other embodiments, the storage unit 11 may be a cloud storage device that is not disposed in the vehicle 5, and that is accessible by the processing unit 15 via wireless communication.

In this embodiment, the image capturing unit 12 may be a camera device with a photographic lens (e.g., a wide-angle lens), and is disposed above the driver's seat in the vehicle 5 so that the image capturing unit 12 may capture a video showing a side of the steering wheel of the vehicle 5 that faces the driver and surroundings of the vehicle 5 (i.e., the environment in front and/or on two sides of the vehicle 5) at the same time. In some embodiments, the image capturing unit 12 includes a plurality of camera devices each having the photographic lens, one of the camera devices is for capturing the video showing the steering wheel, and other camera devices are for capturing videos showing the surroundings of the vehicle 5 in various directions.

In this embodiment, the angle sensing unit 13 may be an inclination sensor that is mounted on the vehicle 5, and that is configured to measure a slant angle between a front-rear direction of the vehicle 5 and a horizontal direction. The front-rear direction of the vehicle 5 is a direction along the front and the back of the vehicle 5, and is also a direction along a front wheel and a rear wheel on the same side of the vehicle 5. In some embodiments, the angle sensing unit 13 may be an electronic level meter or a gyroscope. In some embodiments, the angle sensing unit 13 may include one or more of an inclination sensor, an electronic level meter and a gyroscope. In general, the angle sensing unit 13 is not limited to the embodiments of this disclosure, and may be any device that is capable of measuring the slant angle.

In this embodiment, the output unit 14 includes a display device and a buzzer that are, for example, disposed around the driver's seat in the vehicle 5. In some embodiments, the output unit 14 may include one or more of the display device, the buzzer and a vibrator.

In this embodiment, the processing unit 15 may be a central processing unit (CPU). In some embodiments, the processing unit 15 may be a plurality of CPUs, each of which is electrically connected to one another, or a circuit board of a control circuit that includes a CPU. In some embodiments, the processing unit 15 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. Furthermore, in some embodiments, the processing unit 15 may be electrically connected to an electronic control unit (ECU) of the vehicle 5 to obtain operating parameters (e.g., driving speed) related to the vehicle 5 from the ECU.

In this embodiment, the digital data stored in the storage unit 11 may include an image recognition model that may be a neural network model such as an R-CNN model, a Fast R-CNN model, a Mask R-CNN model, a YOLO model, etc., that has been trained by using a large number of images of steering wheels at various angular positions and the angular positions of the steering wheels in these images, and that may be loaded and executed by the processing unit 15. By loading and executing the image recognition model, the processing unit 15 may perform image recognition on the video captured by the image capturing unit 12 to obtain a rotation status of the steering wheel of the vehicle 5 and a motion status of the vehicle 5 according to changes in the surroundings of the vehicle 5 in the video.

More specifically, in this embodiment, the processing unit 15 uses the image recognition model to recognize the steering wheel by, for example, features of appearance of the steering wheel so as to obtain the rotation status of the steering wheel. The rotation status of the steering wheel refers to an angular position of the steering wheel that ranges from 0 to 360 degrees, where the angular position of the steering wheel at 0 degrees is referred to as an original position. The features of appearance of the steering wheel may be, but not limited to, the car brand logo at the center of the steering wheel, the outer ring of the steering wheel, the spoke(s) of the steering wheel, and/or a specific marker (e.g., a sticker) that is pre-attached to the steering wheel. In addition, the processing unit 15 may use the image recognition model to recognize objects (such as the markings on the road, lanes, traffic signals, traffic signs, roadside trees, buildings, and/or other vehicles around the vehicle 5) from the video, to obtain changes in the relative positions of the objects thus recognized relative to the vehicle 5 by tracking the objects thus recognized, and then, according to the changes in the relative positions of the objects, to obtain the motion status of the vehicle 5 (i.e., going straight, turning left/right, or not moving). It should be noted that approaches to obtain the rotation status of the steering wheel and the motion status of the vehicle 5 are not limited to the details described above. For example, in some embodiments where the processing unit 15 is electrically connected to the ECU of the vehicle 5, the processing unit 15 may determine the motion status of the vehicle 5 and the rotation status of the steering wheel based on data from the ECU. For example, the processing unit 15 may determine whether the motion status of the vehicle 5 is "going straight" or "making a turn" according to activation of the lane departure warning system (LDWS) of the vehicle 5 and a high-definition (HD) map. For example, when the LDWS of the vehicle 5 is not activated and the HD map shows that the vehicle 5 is driven on a curved lane, the processing unit 15 may determine that the motion status of the vehicle 5 is "making a turn." Alternatively, when the LDWS of the vehicle 5 is activated and the HD map shows that the vehicle 5 is driven on a straight lane, the processing unit 15 may also determine that the motion status of the vehicle 5 is "making a turn." Furthermore, in some embodiments, the processing unit 15 may estimate a current status of the vehicle according to variation of values of a G-sensor and variation of values of a gyroscope, and then determine whether the motion status of the vehicle 5 is "going straight" or "making a turn."

The system 1 of this embodiment may be independently manufactured and sold, and is mounted on the vehicle 5 after the vehicle 5 is manufactured. In some embodiments, the system 1 may be built into the vehicle 5 during the manufacturing of the vehicle 5, and the processing unit 15 of the system 1 may be the ECU of the vehicle 5 or a part of the ECU of the vehicle 5. In addition, in some embodiments where the system 1 does not include the output unit 14, the processing unit 15 may be electrically connected to, for example, a display and a speaker of the vehicle 5 such that the display and the speaker of the vehicle 5 cooperatively serve as an output unit of the system 1.

Figure 2:
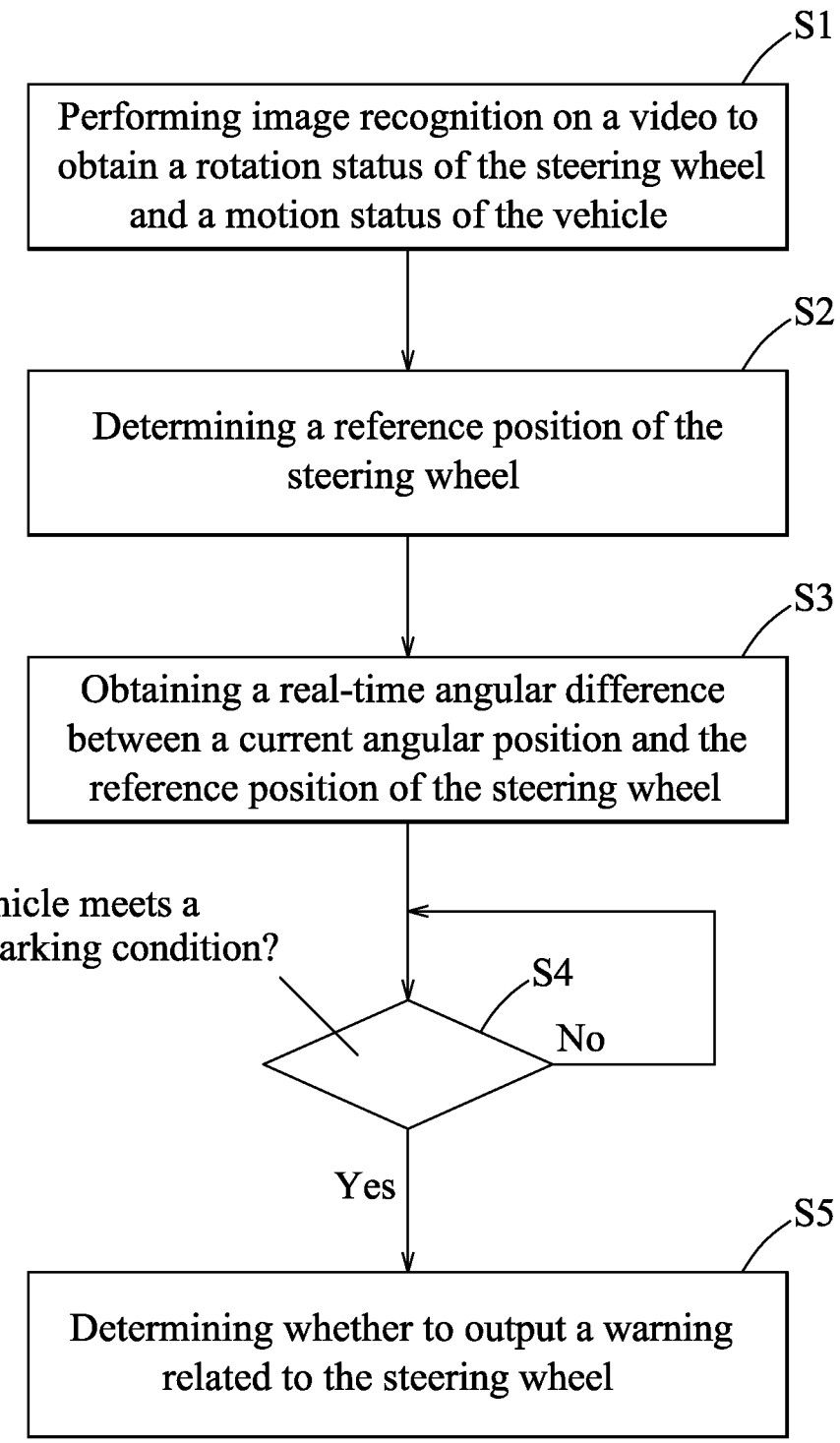
FIG. 2 is a flow chart illustrating a method for outputting the warning when the vehicle is parked on the slope according to one embodiment of the disclosure.

FIG. 2 is a flow chart illustrating a method for outputting the warning when the vehicle 5 is parked on the slope according to one embodiment of the disclosure. In this embodiment, the method is to be implemented by the system 1 as described in FIG. 1. The method includes step S1 to step S5.

In step S1, the processing unit 15 controls the image capturing unit 12 to capture the video when the vehicle 5 is started, obtains the video from the image capturing unit 12, and performs image recognition on the video by executing the image recognition model.

More specifically, in this embodiment, the video is a real-time video that is continuously generated by the image capturing unit 12, and that shows the steering wheel and the surroundings of the vehicle 5 at the same time. The processing unit 15 performs image recognition on the video to recognize the steering wheel of the vehicle 5 from the video so as to obtain the rotation status of the steering wheel, and recognize objects in the surroundings from the video so as to obtain the motion status of the vehicle 5 according to changes in the relative positions of the objects thus recognized relative to the vehicle 5.

Furthermore, in some embodiments where the image capturing unit 12 is the plurality of camera devices, the processing unit 15 may perform image recognition on videos generated by all of the camera devices so as to obtain the rotation status of the steering wheel and the motion status of the vehicle 5.

In step S2, the processing unit 15 determines a reference position of the steering wheel of the vehicle 5 based on result obtained from the image recognition performed on the video (i.e., the rotation status of the steering wheel and the motion status of the vehicle 5).

In this embodiment, the processing unit 15 defines an angular position of the steering wheel that makes the vehicle 5 go straight as the reference position according to the rotation status of the steering wheel and the motion status of the vehicle 5. More specifically, the processing unit 15 determines whether or not the rotation status of the steering wheel is stationary at 0 degrees and whether or not the motion status of the vehicle 5 is "going straight." When it is determined that the rotation status of the steering wheel is stationary at 0 degrees and that the motion status of the vehicle 5 is "going straight" (in other words, both of the determinations above are affirmative), the processing unit 15 defines the angular position of the steering wheel of this moment as the reference position. Generally, the reference position is the original position of the steering wheel.

It should be noted that even though the steering wheel shown in the video is at 0 degrees, it does not necessarily mean that the vehicle 5 will go straight. For example, if the driver turns the steering wheel 360 degrees to the right from the original position, the rotation status of steering wheel would still be at "0 degrees," but the vehicle 5 would turn right (i.e., the motion status of the vehicle is "turning right"). That is to say, the determination solely based on the rotation status of the steering wheel (i.e., whether or not the steering wheel is stationary at 0 degrees) is not enough for determining the reference position of the steering wheel. Therefore, by determining whether or not the rotation status of the steering wheel is stationary at 0 degrees and whether or not the motion status of the vehicle 5 is "going straight" simultaneously, the processing unit 15 of this embodiment is capable of accurately determining the reference position.

In addition, in this embodiment, the processing unit 15 is configured to determine whether or not the rotation status of the steering wheel is 0 degrees by determining whether or not the car brand logo on the steering wheel is upside down or tilted. In some embodiments, the processing unit 15 may determine whether or not the rotation status of the steering wheel is 0 degrees by determining whether or not the spokes are symmetrical in a left-right direction, or whether or not the specific marker on the steering wheel faces a specific direction.

In step S3, the processing unit 15 obtains a real-time angular difference between a current angular position of the steering wheel and the reference position of the steering wheel. More specifically, the processing unit 15 analyzes the video and updates the real-time angular difference in real time by tracking the features of appearance of the steering wheel thus recognized to obtain the current angular position of the steering wheel. For example, if the processing unit 15 determines that the steering wheel is maintained at the reference position, the processing unit 15 then maintains the real-time angular difference obtained by the processing unit 15 at 0 degrees. If the processing unit 15 determines that the steering wheel has been rotated a half turn to the right from the reference position, the processing unit 15 then updates the real-time angular difference to 180 degrees. If the processing unit 15 determines that the steering wheel has been rotated one and a half turns to the left from the reference position, the processing unit 15 then updates the real-time angular difference to −540 degrees. In some embodiments where the processing unit 15 is electrically connected to the ECU of the vehicle 5, the processing unit 15 may determine the current angular position of the steering wheel based on data from the ECU.

In step S4, the processing unit 15 obtains the slant angle from the angle sensing unit 13, and determines whether or not the vehicle 5 meets a slope-parking condition in which the vehicle 5 is parked on a slope based on the slant angle and the motion status of the vehicle 5. It should be noted that the processing unit 15 may continuously obtain the slant angle from the angle sensing unit 13.

More specifically, in this embodiment, the slant angle represents an angle between the front-rear direction of the vehicle 5 and the horizontal direction. The slope-parking condition is met, for example, when the slant angle is greater than or equal to a predetermined slant angle threshold (e.g., 10 degrees, but not limited thereto), and when the vehicle 5 is not moving (i.e., the motion status of the vehicles 5 is "not moving"). In other words, when the vehicle 5 meets the slope-parking condition, the vehicle 5 is stopped on the slope.

In this embodiment, the processing unit 15 determines the motion status of the vehicle 5 according to the surroundings of the vehicle 5 shown in the video. In other embodiments where the processing unit 15 is connected to the ECU of the vehicle 5, the processing unit 15 may obtain the driving speed of the vehicle from the ECU to determine whether or not the vehicle 5 is moving.

Furthermore, in some embodiments where the processing unit 15 is connected to the ECU of the vehicle 5, the slope-parking condition may further include conditions such as the handbrake of the vehicle 5 being pulled, the gearshift of the vehicle 5 being at park, and/or the ignition switch of the vehicle 5 being turned off. In this case, the processing unit 15 determines whether or not the handbrake is pulled, whether or not the gearshift is at park, and whether or not the ignition switch is turned off based on the operating parameters obtained from the ECU of the vehicle 5 such that the slope-parking condition may accurately represent the vehicle 5 being parked on a slope.

When the processing unit 15 determines that the slope-parking condition is met, the flow proceeds to step S5; otherwise, the flow goes back to the step S4 after a predetermined period of time. It should be noted that during iterations of step S4, step S3 is implemented continuously to obtain the real-time angular difference.

When the processing unit 15 determines that the vehicle 5 meets the slope-parking condition, in step S5, the processing unit 15 determines whether or not to output a warning related to the operation of the steering wheel based on the real-time angular difference. The warning is used to remind the driver to turn the steering wheel.

More specifically, in this embodiment, the processing unit 15 determines whether or not to output the warning by, for example, determining whether or not the absolute value of the real-time angular difference is greater than or equal to a threshold value (for example, 360 degrees, but not limited thereto). When it is determined that the absolute value of the real-time angular difference is not greater than or equal to the threshold value (in other words, the determination above is negative), the processing unit 15 outputs the warning; otherwise, the processing unit 15 does not output the warning.

In other words, in the case where the vehicle 5 meets the slope-parking condition, the processing unit 15 outputs the warning when it is determined that the absolute value of the real-time angular difference is less than the threshold value; the processing unit 15 does not output the warning when the absolute value of the real-time angular difference is greater than or equal to the threshold value. Therefore, the system 1 of this embodiment may effectively notify the driver to turn the steering wheel to a specific angular position before leaving the vehicle 5 when parking on the slope.

It should be noted that the determination of the system 1 of this embodiment on whether or not to output the warning is based on whether or not the angular difference is greater than or equal to the threshold value, such that the system 1 of this embodiment is capable of avoiding incorrectly outputting a warning when the driver has already turned the steering wheel to the specific angular position. For example, when the driver rotates the steering wheel two full turns to the right from the reference position, the steering wheel that is rotated two full turns to the right resembles the steering wheel at the original position in the video. That is to say, the angle of the steering wheel shown in the video (i.e., the rotation status of the steering wheel) is not enough to accurately determine the actual angular position of the steering wheel, which may lead to an incorrect output of the warning. Therefore, by having the processing unit 15 generate the angular difference that represents the actual angular position of the steering wheel, and determine whether or not to output the warning based on the angular difference, this embodiment is able to notify the driver to turn the steering wheel when appropriate, and avoid outputting the warning incorrectly.

The description above exemplarily illustrates how the system 1 of this embodiment may implement the method for outputting the warning when the vehicle 5 is parked on a slope.

It should be noted that the steps S1 to S5 are not implemented in any specific order and may be implemented simultaneously as long as the purpose of the disclosure is achieved.

In summary, by implementing the method for outputting the warning when the vehicle 5 is parked on a slope, the system 1 may output the warning when the slope-parking condition is met and the steering wheel is not turned enough. The warning serves to notify the driver to rotate the steering wheel correctly, thereby avoiding accidents.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for outputting a warning when a vehicle is parked on a slope, the method to be implemented using a system that is mounted on the vehicle, the method comprising steps of:
    determining a reference position of a steering wheel of the vehicle according to a motion status of the vehicle and a rotation status of the steering wheel of the vehicle with assistance of image recognition;
    obtaining a real-time angular difference between a current angular position of the steering wheel and the reference position of the steering wheel; and
    when the vehicle meets a slope-parking condition in which the vehicle is parked on the slope, determining whether or not to output a warning related to operation of the steering wheel based on the real-time angular difference.

2. The method as claimed in claim 1, further comprising a step of performing the image recognition on a video that shows surroundings of the vehicle and the steering wheel so as to obtain the motion status of the vehicle and the rotation status of the steering wheel of the vehicle.

3. The method as claimed in claim 1, wherein the step of determining a reference position of a steering wheel of the vehicle is to define an angular position of the steering wheel that makes the vehicle go straight as the reference position.

4. The method as claimed in claim 1, wherein the step of determining whether or not to output a warning includes:
    determining whether or not an absolute value of the real-time angular difference is greater than or equal to a threshold value;
    outputting the warning when the absolute value of the real-time angular difference is less than the threshold value; and
    not outputting the warning when the absolute value of the real-time angular difference is greater than or equal to the threshold value.

5. The method as claimed in claim 1, wherein the slope-parking condition is met when the vehicle is not moving, and when a slant angle between a front-rear direction of the vehicle and a horizontal direction is greater than or equal to a slant angle threshold.

6. A system for outputting a warning when a vehicle is parked on a slope, said system adapted to be mounted on the vehicle, and comprising:
    an image capturing unit that is configured to capture a video; and
    a processing unit that is electrically connected to said image capturing unit to receive the video, and that is configured to
        determine a reference position of a steering wheel of the vehicle according to a motion status of the vehicle and a rotation status of the steering wheel of the vehicle with assistance of image recognition performed on the video,
        obtain a real-time angular difference between a current angular position of the steering wheel and the reference position of the steering wheel, and
        when the vehicle meets a slope-parking condition in which the vehicle is parked on the slope, determine whether or not to output a warning related to operation of the steering wheel based on the real-time angular difference.

7. The system as claimed in claim 6, wherein said image capturing unit is configured to capture the video that shows surroundings of the vehicle and the steering wheel, and said processing unit is configured to perform the image recognition on the video so as to obtain the motion status of the vehicle and the rotation status of the steering wheel of the vehicle.

8. The system as claimed in claim 6, wherein said processing unit is configured to determine the reference position by defining an angular position of the steering wheel that makes the vehicle go straight as the reference position.

9. The system as claimed in claim 6, wherein said processing unit is configured to determine whether or not to output a warning by:
- determining whether or not an absolute value of the real-time angular difference is greater than or equal to a threshold value;
- outputting the warning when the absolute value of the real-time angular difference is less than the threshold value; and
- not outputting the warning when the absolute value of the real-time angular difference is greater than or equal to the threshold value.

10. The system as claimed in claim 6, wherein the slope-parking condition is met when the vehicle is not moving, and when a slant angle between a front-rear direction of the vehicle and a horizontal direction is greater than or equal to a slant angle threshold.

* * * * *